Patented July 8, 1941

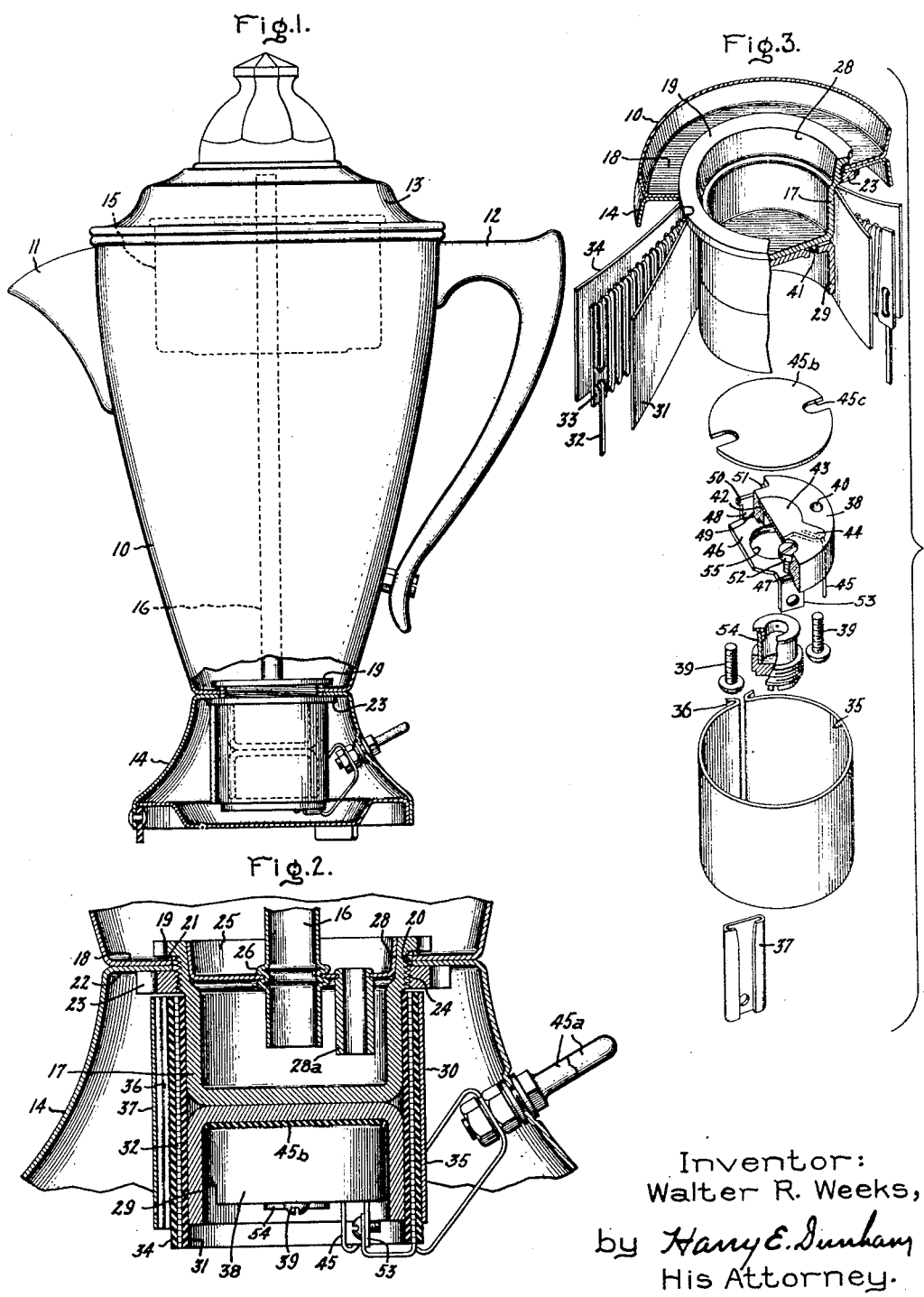

2,248,595

UNITED STATES PATENT OFFICE 2,248,595

COFFEE MAKER

Walter R. Weeks, Hamden, Conn., assignor to General Electric Company, a corporation of New York Application December 31, 1938, Serial No. 248,750

7 Claims. (Cl. 219—43)

This invention relates to coffee makers and the like, and it has for its object the provision of an improved device of this character which has a simple, inexpensive construction, and which is efficient and safe in its operation.

More specifically, this invention contemplates an improved organization in coffee makers and the like of a liquid heating chamber and a thermal protective device for deenergizing the heating element of the coffee maker before a dangerously high temperature condition can be attained.

In accordance with this invention, the coffee maker in one form thereof is provided in its base with a pair of reversely arranged cups having their bases united so that they open in opposite directions. One cup is in liquid communication with the water reservoir of the coffee maker and serves as a heating chamber for the water. The water that is heated is delivered through a fountain tube to the coffee grounds.

The other cup functions to support a thermal protective device including a fuse that is connected in the energizing circuit of the coffee maker heating element, and functions to open this circuit before a dangerously high temperature is attained.

The heating element preferably is of sleeve-like form, and is positioned around the side walls of the two cups.

For a more complete understanding of this invention, reference should be had to the accompanying drawing in which Fig. 1 is a side elevation of a coffee maker embodying this invention, parts being shown in section so as to illustrate certain details of construction; Fig. 2 is an enlarged fragmentary vertical sectional view taken through a part of the coffee maker of Fig. 1; and Fig. 3 is an expanded perspective view illustrating certain parts of the coffee maker of Figs. 1 and 2 and demonstrating the positional relationship between these parts.

Referring to the drawing, this invention has been shown in one form as applied to a coffee maker of the percolator type. This coffee maker, as shown, comprises a vessel 10 which serves as a reservoir for the water and also for the coffee infusion that is made. The vessel 10 has a pouring spout 11 and a handle 12. It is covered by a lid 13. The vessel 10 is supported on a hollow base 14.

Mounted in the upper part of the vessel 10 is a container 15 for receiving the coffee grounds. This container is supported by means of a fountain tube 16 which functions to deliver heated water to the coffee ground container 15.

Water is heated and delivered to the fountain tube 16 by means of a heating organization comprising a metallic cup-shaped member, which is mounted below the inturned bottom wall 18 of the vessel 10, and which opens upwardly through this bottom wall, as clearly shown in Fig. 2. As shown, the cup at its upper edge is provided with an outwardly extending horizontal flange 19 which lies over the bottom wall 18 of the vessel 10. It will be understood that the bottom wall 18 is provided with a centrally-arranged aperture 20 through which the cup member 17 is inserted so that its flange 19 is positioned over the bottom wall. Preferably, a sealing ring 21 will be interposed between the bottom wall 18 and the flange 19.

The base 14 is provided with an inturned top wall 22 similar to the bottom wall 18 of vessel 10, and this top wall 22 directly engages and is secured to the bottom wall 18 so as to support the vessel 10; it may be secured in any suitable manner, as by spot-welding. The cup 17 is secured to the two walls 18 and 22 by means of a large nut 23 positioned below the wall 18 and screwed in a threaded section 24 on the upper end of the cup 17.

The fountain tube 16 is supported in a cup 25 which is rigidly secured to the lower end of the fountain tube by a crimped section 26 on the tube engaging the upper and lower sides of the bottom wall of the cup, as clearly shown in Fig. 2. The cup 17 is provided at its upper end with a seat 28 which receives the cup 25. It will be understood that the seat 28 supports the cup 25 and fountain in their proper operative positions shown in Figs. 1 and 2, and that the cup 25 may be easily positioned in the seat and withdrawn therefrom.

A tube 28a passes through the bottom wall of the cup 25 and extends downwardly so that its lower end is relatively close to the bottom wall of the cup 17. The tube at its upper end is secured to the bottom wall of the cup 25 by having its upper end peened over, as clearly shown in Fig. 2. This tube functions to convey charges of liquid from the vessel 10 into the cup 17.

Positioned under the cup 17 is a second metallic cup 29. As shown, the cup 29 is arranged reversely to the cup 17, and has its bottom wall or base secured to the bottom wall or base of the upper cup 17. Preferably, the cups will be united by brazing with silver solder. The cup 29 functions to house a suitable protective device for the heating element 30 of the coffee maker. This heating element 30, as shown, is of the sleeve type and surrounds the side walls of both the upper cup 17 and the lower cup 29. The heating element comprises an inner sheet 31 formed of any suitable electrically insulating material, such as mica, and which surrounds the side walls of the two cups 17 and 29. The heating element further comprises a resistance conductor 32 which is mounted upon a suitable insulating support 33, such as a sheet of mica. This sheet of mica with the resistance conductor is wrapped around the inner sheet 31, and it in turn is surrounded by a second sheet of mica 34. The sheet 31, the sheet 33 supporting the resistance conductor, and the sheet 34 are clamped to the cups by means of a metal clamping sleeve 35. The sleeve 35 is folded about the cup so that its two ends are brought adjacent each other, as shown in Fig. 3, and these ends are provided with folded-back sections 36 which slidably receive a clamp 37.

The protective device mounted in the cup 29 comprises an electrically insulating support 38, which preferably will be formed of porcelain. This support, as shown, is of ring-shape, and it is secured to the bottom wall of the cup 29 by a pair of screws 39 that are directed upwardly through apertures 40 provided for them in the insulator and which are received in threaded holes 41 in the base of the cup 29. The insulator 38 is provided with a circular recess 42 in its top which receives a circular fuse contact plate 43. This plate 43 is provided with an ear 44 inserted in a recess provided for it in the top wall of the insulator, and secured to this ear is a conductor 45 which is electrically connected with one of the twin supply terminals 45a of the coffee maker.

It will be observed that the fuse contact plate 43 and its ear 44 are secured between the insulator and the bottom wall of the cup 29. An insulating sheet of mica 45b is interposed between the top of insulator 38 and this bottom wall to insulate the fuse plate 43 from the bottom wall. This sheet 45b is provided with diamterically opposed slots 45c that receive the screws 39.

The insulator 38 also functions to support a fuse bracket 46 which is fitted in a recess 47 provided in the bottom of the insulator. This bracket has an upright tongue 48 at its left end, as viewed in Fig. 3, that is received in a recess 49 provided for it in the side of the insulator. This tongue at its upper end has laterally extending projections 50 that engage abutments 51 provided in the recess 49 and which interlock the left-hand end of the bracket and the insulator. The opposite end of the bracket is secured to the insulator by means of a screw 52. At this opposite end, the bracket is provided with a downwardly extending tongue 53 to which one end of the resistance conductor 32 is electrically connected, as clearly shown in Fig. 2. The opposite end of the resistance conductor of the heater is electrically connected to the other twin supply terminal 45a.

The electrical circuit through the heater is completed by means of a fuse cylinder or plug 54 which is screwed in a threaded aperture 55 in the bracket so as to have its upper end engaging the fuse contact plate 43. It will be understood that the fuse cylinder will be formed of any suitable fusible metal, such as tin, which will fuse at a temperature of substantially 450° F.

It will be observed that in the operation of the coffee maker when the current is turned on by attaching the terminals 45a to a suitable source of electrical supply, heat will be imparted to the side walls of the two metallic cups 17 and 29. The heat applied to these side walls flows into their bottom walls so that a heating chamber is provided in the upper cup 17 which is heated on its side and bottom walls. The water which is heated in this chamber 17 is forced by percolating action through the coffee basket 15. In the event the water should boil dry, the metal walls of the cups will heat up until eventually they will attain the fusing temperature of the fusing plug 54 which thereupon will melt and break the circuit through the fuse contact plate 43 and the fuse bracket 46. This prevents overheating of the coffee maker. In the event that the plug 54 has fused, a new plug may be applied merely by screwing it in the bracket 46 until it engages the fuse contact plate 43.

It will be observed that I have provided a very simple and inexpensive organization of heating means and fuse protective device in a coffee maker. The upper cup 17 functions not only as a heating chamber, but which also functions to support the fountain tube and in addition supports the fuse cup 29. The lower cup 29 functions as a protective chamber for the fuse organization. The parts are of simple and inexpensive construction and can be readily assembled together.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a coffee maker and the like having a liquid receiving vessel provided with a bottom wall, a pair of reversely positioned cup-shaped members having substantially equal outside dimensions located below said bottom wall, said members having their bases secured to each other, one of said members opening upwardly through said bottom wall into said vessel and constituting a water heating chamber, a heating element surrounding the side walls of said cup-shaped members, and a thermally responsive protective element mounted in the other of said cup-shaped members connected in the energizing circuit of said heating element arranged to break said circuit when the temperature of the cup shaped members attains a predetermined high value.

2. In a coffee maker and the like having a liquid receiving vessel, a liquid heating cup below said vessel having its open end facing the vessel and in liquid communication with the vessel, a fountain tube mounted in the mouth of said cup, a heating element for heating the liquid in said cup, a second cup below the first having its base secured to the base of the first, an electrically insulating fuse holder mounted in said second cup, a fuse contact plate supported by said holder in thermal relation with the base of said second cup, a fuse mounted in said holder in electrical contact with said fuse contact plate, and means connecting said contact plate and fuse in the energizing circuit of said heating element.

3. In a coffee maker and the like having a liquid heating chamber, an electrical heating element for applying heat to said chamber, a cup having its bottom wall secured in direct thermal relation with the wall of said chamber, a contact plate in said cup, an electrically insulating support clamping said plate in thermal relation with said bottom wall, a fuse bracket also in said cup mounted on said insulating support, a fuse threaded in said bracket so as to engage said contact plate, and electrical connections between said contact plate and bracket and said heating element.

4. In a coffee maker and the like comprising a water reservoir having an inturned flange-like bottom wall, a base for said reservoir having an inturned upper wall fitted under the inturned bottom wall of the reservoir, a cup member directed downwardly through the apertures provided for it by the inturned walls of the reservoir and base and having a flange extending over the upper surface of the inturned wall of the reservoir, and the upper section of the cup having an exterior thread which receives a nut to secure the cup to said inturned walls, a second cup within the base reversely arranged to the first having its bottom wall secured to the bottom wall of the first cup so as to be supported thereby, a sleeve-like electrical heating element surrounding the side walls of the two cup members, and a thermally-responsive fuse mounted in the second cup connected in the energizing circuit of the heating element to interrupt this circuit when the temperature of the cup members attains a predetermined value.

5. In a coffee maker and the like having a liquid heating chamber, an electrical heating element for applying heat to said chamber, a second chamber having its bottom wall secured in direct thermal relation with a wall of said first chamber, a contact plate in said second chamber, an electrically insulating support having a recess receiving said contact plate and clamping said plate in thermal relation with said bottom wall, a fuse mounted on said insulating support so as to engage said contact plate, and electrical connections between said contact plate, fuse and heating element.

6. In a coffee maker and the like having a liquid heating chamber, an electrical heating element for applying heat to said chamber, a second chamber having its bottom wall secured in direct thermal relation with a wall of said first chamber, a contact plate in said second chamber, an electrically insulating support having a recess receiving said contact plate and clamping said plate in thermal relation with said bottom wall, a fuse bracket mounted on said insulating support having a threaded aperture in alignment with said contact plate, a fuse threaded in said bracket so as to engage said contact plate, and electrical connections between said contact plate and bracket and said heating element.

7. In a coffee maker and the like having a liquid heating chamber, an electrical heating element for applying heat to said chamber, a cup having its bottom wall secured in direct thermal relation with a wall of said chamber, a contact plate in said cup, an electrically insulating support mounted in said cup having a longitudinal aperture therethrough and a recess in its upper surface receiving said contact plate so as to hold it in thermal relation with said bottom wall, a fuse bracket mounted on the bottom wall of said support, a fuse mounted in said bracket extending upwardly through said aperture to engage said contact plate, and electrical connections between said contact plate and bracket and said heating element.

WALTER R. WEEKS.

CERTIFICATE OF CORRECTION.

Patent No. 2,248,595.                         July 8, 1941.

WALTER R. WEEKS.

It is hereby certified that error appears in the printed specification of the above numbered patent requiring correction as follows: Page 2, first column, line 43, for "diamterically" read --diametrically--; page 3, first column, line 5, claim 4, for "In a" read --A--; and that the said Letters Patent should be read with this correction therein that the same may conform to the record of the case in the Patent Office.

Signed and sealed this 9th day of September, A. D. 1941.

(Seal)

Henry Van Arsdale,
Acting Commissioner of Patents.